United States Patent
Frensch

(10) Patent No.: US 11,962,705 B2
(45) Date of Patent: Apr. 16, 2024

(54) SECURE SERVERLESS COMPUTING FRAMEWORK

(71) Applicant: Capital One Services, LLC, McLean, VA (US)

(72) Inventor: Steve Frensch, Kitchener (CA)

(73) Assignee: Capital One Services, LLC, McLean, VA (US)

(*) Notice: Subject to any disclaimer, the term of this patent is extended or adjusted under 35 U.S.C. 154(b) by 371 days.

(21) Appl. No.: 17/496,653

(22) Filed: Oct. 7, 2021

(65) Prior Publication Data

US 2023/0112806 A1    Apr. 13, 2023

(51) Int. Cl.
*H04L 9/32* (2006.01)
*H04L 9/40* (2022.01)
*G06Q 20/40* (2012.01)

(52) U.S. Cl.
CPC ........ *H04L 9/3236* (2013.01); *H04L 63/1466* (2013.01); *G06Q 20/4016* (2013.01)

(58) Field of Classification Search
CPC .............. H04L 9/3236; H04L 63/1466; H04L 63/1425; H04L 2463/102; G06Q 20/4016; G06Q 20/3827; G06Q 20/401; G06Q 2220/00; G06F 21/57

See application file for complete search history.

(56) References Cited

U.S. PATENT DOCUMENTS

| | | | |
|---|---|---|---|
| 8,589,698 B2 * | 11/2013 | McBrearty | H04L 9/3236 714/E11.212 |
| 10,305,914 B1 | 5/2019 | Brin et al. | |
| 10,873,586 B2 | 12/2020 | Vohra et al. | |
| 2013/0117808 A1 * | 5/2013 | Shin | G06F 21/50 726/1 |
| 2017/0244729 A1 * | 8/2017 | Fahrny | H04L 63/0823 |
| 2017/0344361 A1 * | 11/2017 | Zhang | G06F 8/654 |
| 2018/0109516 A1 * | 4/2018 | Song | H04L 9/3239 |
| 2020/0204618 A1 * | 6/2020 | Agarwal | H04L 63/1458 |
| 2020/0241942 A1 | 7/2020 | Crouse et al. | |
| 2020/0302059 A1 * | 9/2020 | Rubin | G06F 8/70 |
| 2020/0387893 A1 * | 12/2020 | Maim | G06F 21/51 |
| 2021/0144517 A1 | 5/2021 | Bernat et al. | |

(Continued)

FOREIGN PATENT DOCUMENTS

| | | | | |
|---|---|---|---|---|
| CN | 110226317 A | * | 9/2019 | .......... G06F 11/3457 |
| GB | 2407236 A | * | 4/2005 | .......... H04L 9/0844 |

(Continued)

*Primary Examiner* — Sarah Su
(74) *Attorney, Agent, or Firm* — Perkins Coie LLP

(57) ABSTRACT

A serverless computing framework is secured against malicious payload injection. A series of functions can be strung together to perform a workflow in response to a triggering event. A validator can be included with a function that verifies that an input payload originated from a trusted source. A validation value, such as a hash, can be computed based on the result payload in combination with the source code of the function that produced the result payload. A downstream function can receive the result payload and the hash and utilize the result payload and a copy of the upstream source code to produce another hash. The received and generated hashes can then be compared and utilized to control execution of the downstream function. Execution can be prevented when there is a mismatch between the hashes.

20 Claims, 11 Drawing Sheets

(56) References Cited

U.S. PATENT DOCUMENTS

| | | | | |
|---|---|---|---|---|
| 2021/0374234 A1* | 12/2021 | Bursell | ............... | G06F 21/6218 |
| 2022/0278847 A1* | 9/2022 | Bettger | ................. | H04L 9/3239 |
| 2022/0311794 A1* | 9/2022 | Maya | ................... | G06F 11/3065 |
| 2023/0048589 A1* | 2/2023 | Shannon | .................... | G06F 8/70 |

FOREIGN PATENT DOCUMENTS

| | | | |
|---|---|---|---|
| WO | WO-2010121795 A1 * | 10/2010 | ........... G05B 19/042 |
| WO | 2019040651 | 2/2018 | |
| WO | WO-2018234882 A1 * | 12/2018 | |
| WO | WO-2020058008 A1 * | 3/2020 | ........... G06F 21/121 |
| WO | WO-2020155811 A1 * | 8/2020 | ............. G06F 16/27 |

* cited by examiner

SECURE SERVERLESS COMPUTING FRAMEWORK

BACKGROUND

Serverless computing allows developers to focus on business logic rather than setting up, maintaining, and managing servers. Serverless computing can be implemented by way of functions that are uploaded and executed on remote servers. Such a platform is termed function as a service (FaaS), which is implemented with cloud computing services that handle the complexities of building and maintaining the infrastructure required for applications. In essence, the server is abstracted away or hidden from developers. The functions can be event-driven. In response to an event, execution of one or more functions can be triggered with required computing resources being provided automatically.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, the subject disclosure pertains to a secure serverless computing framework that comprises a series of functions strung together to perform a workflow in response to an event. A validator can be implemented for functions to verify that a payload received by a function is from a trusted source prior to executing the function. A first validation value, such as a hash, can be computed based on a payload and source code, that when executed, generated the payload. The payload and the validation value can be sent to a second function. In response, the second function validator generates a second validation value from the payload and source code of the first function. If the validation values match, execution of the second function can be initiated. Alternatively, if there is a mismatch in validation values, execution of the second function can be prevented.

According to one aspect, a system is provided comprising a processor coupled to a memory that includes instructions associated with a function of a serverless framework. When executed, the instruction can cause the processor to execute a first function to generate a result payload, acquire source code for the first function, compute a validation value based on the result payload and the source code, and output the result payload and the validation value to a second function. The validation value can be a hash of the result payload combined with the source code. Alternatively, the validation value can correspond to encrypted data corresponding to a combination of the result payload and the source code or an encrypted hash of the combination. Instructions of a second function can further cause the processor to compute a second validation value based on the result payload and the source code of the first function, compare the second validation value to the first validation value, and control execution of the second function based on a result of the compare. The instructions can cause the processor to prevent execution of the second function when there is a mismatch between the second validation value and the first validation value. The first function and the second function can comprise a workflow that identifies an abnormal merchant transaction and sends a notification to a user regarding the transaction or a workflow that performs processing in response to an account change.

According to another aspect, a method of providing function as a service is provided. The method comprises executing a first function to generate a result payload, acquiring source code for the first function that generated the result payload, computing a first hash of the result payload and the source code, and outputting the result payload and the first hash to a second function. The method further comprises computing a second hash of the result payload and the source code of the first function, comparing the second hash to the first hash, and controlling execution of the second function based on a result of the comparing. Further, the method comprises preventing execution of the second function when there is a mismatch between the second hash and the first hash or when the source code of the first function is unknown. The method further comprises encrypting the first hash before outputting the first hash. Furthermore, the method comprises computing a second hash from the result payload and the source code of the first function, encrypting the second hash, and controlling execution of the second function based on a result of a comparison of encrypted versions of the first hash and the second hash.

In accordance with another aspect, a method executes, on a processor, instructions that cause the processor to perform operations associated with a function provided as a service in a serverless framework. The operations comprise identifying source code of a first function in response to receipt of a payload and a first hash from the first function, generating a second hash from the payload and the source code of the first function, and controlling execution of a second function based on a comparison between the first hash and the second hash, wherein execution of the second function is prevented when there is a mismatch between the first hash and the second hash. The operations further comprise executing the second function to produce a second payload and generating a third hash from a combination of the second payload and source code of the second function. Further, the operations can prevent the second function's execution when the source code of the first function is unknown. Further operations comprise decrypting the first hash before the comparison when the first hash is encrypted.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Credit card transactions can be processed with a streaming process involving multiple serverless functions strung together by a messaging protocol. A challenge of such a serverless streaming architecture is that a malicious actor could impersonate a payload at some point in the process or modify source code for an upstream function, thereby injecting a malicious payload into the messaging protocol of a downstream function.

Messaging queues can be vulnerable to an attack by a malicious actor seeking to inject a payload. Messaging queues can be write-protected in an attempt to stave off such an attack. However, the ease of misconfiguring such permissions on a shared cloud platform means write protection is only partially effective in preventing malicious payloads from being written. Similarly, encryption can be used for messaging queues, but such encryption can also be subject to the same misconfiguration risks when used on shared cloud computing platforms.

Details disclosed herein generally pertain to an additional layer of protection against potentially inadvertently permitted payload injection by a malicious actor. A mechanism can be employed that validates that a payload originated from a trusted source. Messages between functions can include a payload and a validation value computed based on a combination of the payload and source code that produced the payload. The validation value can be recomputed for an upstream function based on the received payload and a copy of the source code for the downstream function that produced the payload. Execution of the function can be controlled based on comparing the received value to the computed value. If there is a mismatch between the received and computed values, execution of the function can be prevented with respect to the payload. Likewise, execution can be prevented if the function's source code that computed the payload is unknown. However, if the values match, execution can proceed. The value can correspond to a hash value in one instance. Alternatively, the value can be encrypted data or a combination of a hash and encrypted data.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
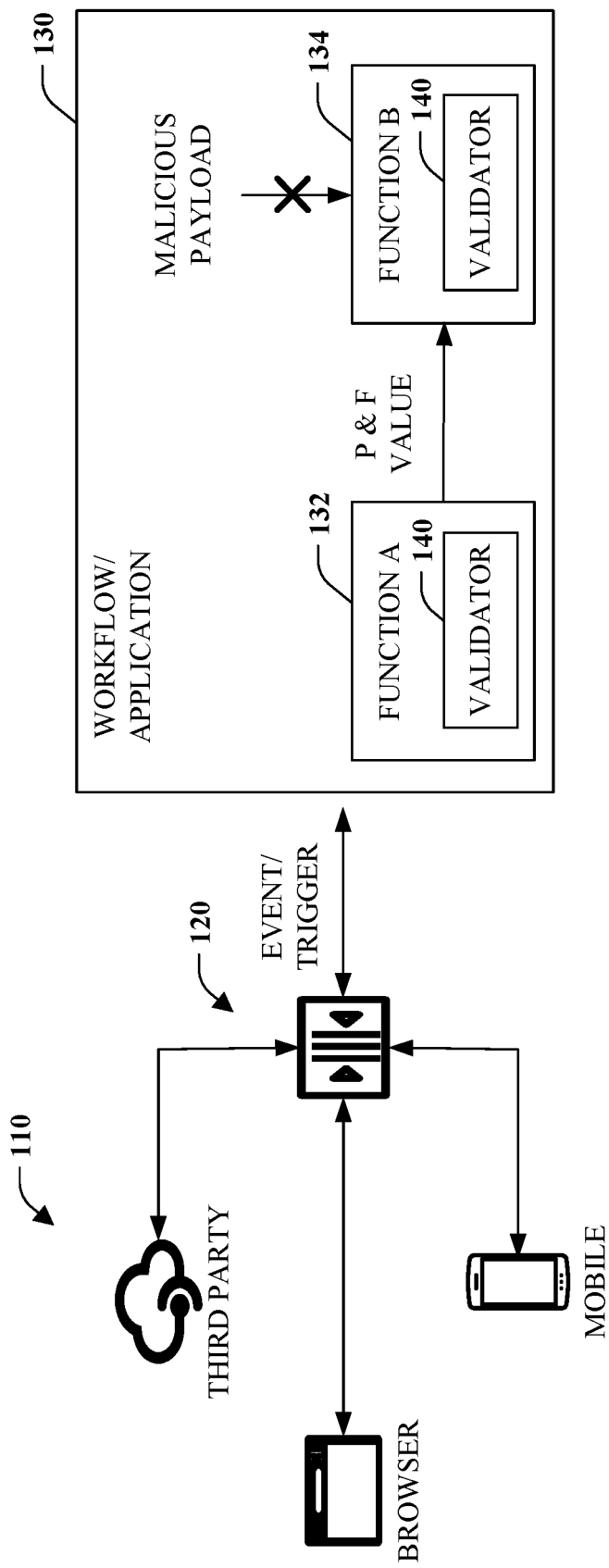
FIG. 1 illustrates an overview of an example implementation.

Referring initially to FIG. 1, a high-level overview of an example implementation is depicted. As shown, the implementation includes a plurality of data sources 110, a queue 120, and a workflow 130. The workflow 130 includes two functions, namely function A 132 and function B 134, both of which include a validator system 140. The implementation corresponds to a serverless, function as a service (FaaS), or streaming architecture. The functions comprising the workflow 130 are uploaded to a cloud service provider (e.g., Amazon Web Services (AWS), Microsoft Azure . . . ), which manages the hardware needed to execute the workflow 130. Developers are thus relieved of the burden of providing and maintaining hardware, allowing them to focus on business logic.

Data can originate from a variety of data sources 110. In one instance, the data can correspond to credit card transactions coming from one or more third party merchants associated with a customer purchase. In another instance, data can originate from customer account changes through a web browser or mobile device application. For example, a customer may change his address or update a phone number on an account. Additional processing by the workflow 130, or application, can be desired with respect to notifying customers of abnormal transactions or completing a change of a customer update, among other things.

The queue 120 is configured to store a collection of data, messages, or events received from data sources for subsequent processing. In accordance with one embodiment, the queue 120 can correspond to a distributed message queuing service that supports sending messages to web services applications over the Internet. Examples of such services include Amazon Simple Queue Service (SQZ), IBM MQ, and Microsoft Message Queuing. In accordance with one aspect, the queue 120 can be configured to be write-protected or employ encryption keys to protect the queue from malicious actors.

The workflow 130, or application, can receive, retrieve, or otherwise obtain or acquire messages from the queue 120. The messages include a header comprising metadata and payload on which processing can occur. For simplicity, the workflow 130 comprises solely two functions strung together, namely function A 132 and function B 134. After receipt of an event or trigger, execution of function A 132 can be initiated. Function A 132 generates a payload and passes the payload to function B 134 for further processing.

Each of the functions includes or has access to a validator service or system 140. The validator system 140 seeks to add a layer of protection against malicious actors by verifying that a trusted source generated an input payload. More specifically, the validator system 140 can generate a value based on the payload code used to generate the payload. This value can then be provided with the payload to a subsequent function. A receiving function can employ the validator system 140 to generate a value based on the received payload and knowledge of the source code of the function that generated the payload. Execution can be controlled based on a comparison between the provided value and the generated value. For example, execution of a function can be prevented when there is a mismatch in values. The value can be a hash value, encrypted value, or a combination thereof.

Figure 2:
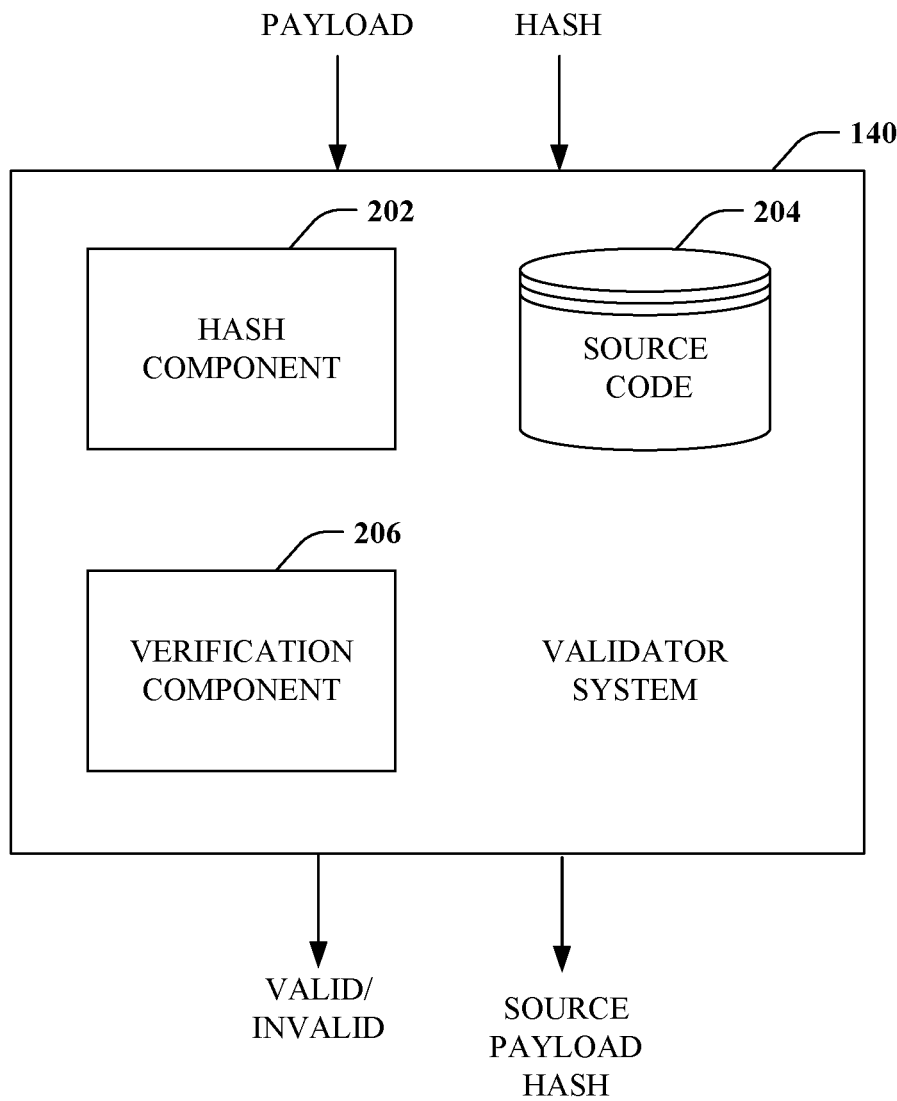
FIG. 2 is a block diagram of an example validator system.

In accordance with one aspect, the validator system 140 can be employed by function A 132. In this instance, the validator system 140 can combine a resulting payload with source code of function A 132 and execute a hash function over the payload and source code to produce a hash value, or, more simply, a hash. The hash and the payload can be sent to function B 134 for further processing. Upon receipt, function B 134 can locate a copy of function A 132, for example, stored locally with function B 134, and combine the received payload with the source code. Subsequently, a hash function can be executed on the combination, and a hash value returned. This generated hash can then be compared with a received hash. If there is a mismatch in hashes, execution of function B on the payload can be prevented. If the hashes match, execution can continue. As shown, function B 134 will not execute on the malicious payload since it will be deemed invalid as failing to provide a hash with a payload or failing to provide a matching hash with the payload Turning attention to FIG. 2, an example validator system 140 is illustrated in further detail. The validator system 140 includes hash component 202, data store 204, and verification component 206. The validator system 140 is operable to produce a hash associated with a payload targeting a downstream function for validation as well as to determine whether or not a received payload is valid or invalid based on a hash. The hash component 202 and verification component 206 can be implemented by a processor coupled to a memory that stores instructions that, when executed, cause the processor to perform the functionality of each component. As such, a computing device is configured to be a special-purpose device that implements the functionality of the validator system 140.

The hash component 202 is operable to generate a hash value for an input by executing a hash function. The hash component 202 can receive, retrieve, or otherwise obtain a function payload. Further, the hash component 202 can receive, retrieve, or otherwise obtain or acquire source code that, when executed, produced the payload. The payload and source code can be combined, for example, by concatenating the payload with the source code or vice versa. Subsequently, a hash function can be executed over the combination.

The data store 204 saves data relevant to validation, such as source code for one or more functions. The data store 204 can store copies of a function's source code for use in generating a combined hash of a produced payload and source code. The data store 204 can also house source code from other upstream functions in a chain of functions. In effect, the data store can maintain a list of other functions from which a function is expected to receive input or interact based on a workflow design. For example, a function Z can maintain source code for function X with which it expects to receive input but not function Y. The data store 204 can be persisted locally with a function or be remotely accessible. Further, the data store 204 can be encrypted in one embodiment to keep the source code secret.

The verification component 206 is operable to compare hashes and produce a result. A payload and first hash can be received as input. In response, the verification component 206 can trigger generation of a second hash from the received payload and source code of a corresponding upstream function acquired from the data store 204. Subsequently, the verification component 206 compares the first hash with the second hash. If the hashes match, the received payload can be deemed validated, and processing can continue. If the hashes do not match, or, in other words, there is a mismatch, the received payload can be deemed invalidated, and processing can be prevented. Additional actions can also be optionally triggered when a payload is classified as invalid. For example, the payload and providing function can be flagged for further analysis.

Figure 3:
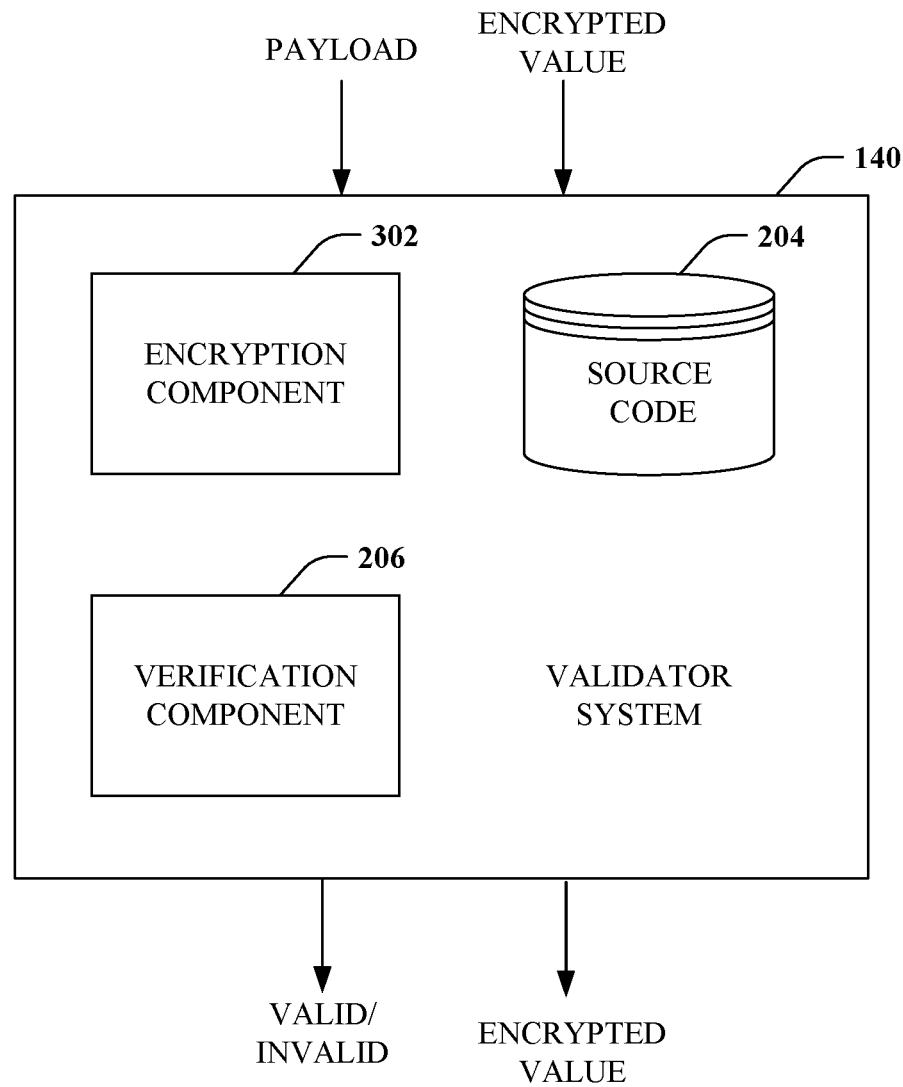
FIG. 3 is a block diagram of another example validator system.

FIG. 3 illustrates another example validator system 140 in accordance with another embodiment. The validator system 140 includes encryption component 302, data store 204, and verification component 206. The validator system 140 is configured to produce an encrypted value for downstream function validation and validate a received payload from an upstream function. The encryption component and the verification component 206 can be computer-executable components specified in terms of instructions that cause a processor to perform the functionality of each component.

The encryption component 302 is operable to produce encrypted data by way of an encryption algorithm or function and decrypt encrypted data. The encryption component 302 can receive, retrieve, or otherwise obtain or acquire a message payload and source code associated with the payload generation. The encryption component 302 can then combine the payload and the source code, for example, by concatenating the payload with the source code. An encryption algorithm is subsequently executed on the combination to produce an encrypted value representative of the payload and the source code. Stated differently, the original plaintext of the combination of payload and source code is encoded into an alternate ciphertext form. In one instance, symmetric-key encryption can be employed in which a single key both encrypts and decrypts data. The key can be saved locally or otherwise made accessible by the encryption component 302. Of course, asymmetric-key encryption can also be employed in which different keys are used to encrypt and decrypt data. For example, a public key for a destination downstream function can be utilized to encrypt the data. In this way, the data can be decrypted downstream, utilizing a corresponding private key of a function to decrypt the data. Alternatively, a downstream function could use its public key to encrypt known payload and corresponding source code for comparison purposes.

The data store 204 can store copies of a function's own source code for use in generating an encrypted value from the combination of a produced payload and source code. The data store 204 can also house source code from other upstream functions in a chain of functions. In effect, the data store can maintain a list of other functions from which a function is expected to receive input or interact based on a design of a workflow.

The verification component 206 is configured to verify or validate that a payload was received from a trusted source. The verification component 206 can initiate generation of an encrypted value for the payload by the encryption component 302. A comparison can be performed between the generated encrypted value and the received encrypted value associated with the payload. In one instance, the comparison can be performed based on the encrypted values. Alternatively, the encrypted values can be decrypted by the encryption component 302 before the comparison. Either way, the determination performed by the verification component 206 concerns whether or not the values are a match or mismatch. If there is a match, the payload is said to be validated. If there is a mismatch, the payload is deemed invalidated or invalid. If the payload is deemed invalid, a function should not process the payload, as it would if the payload was valid. Instead, the execution would be prevented, and other actions may be initiated to address the invalid payload.

Figure 4:
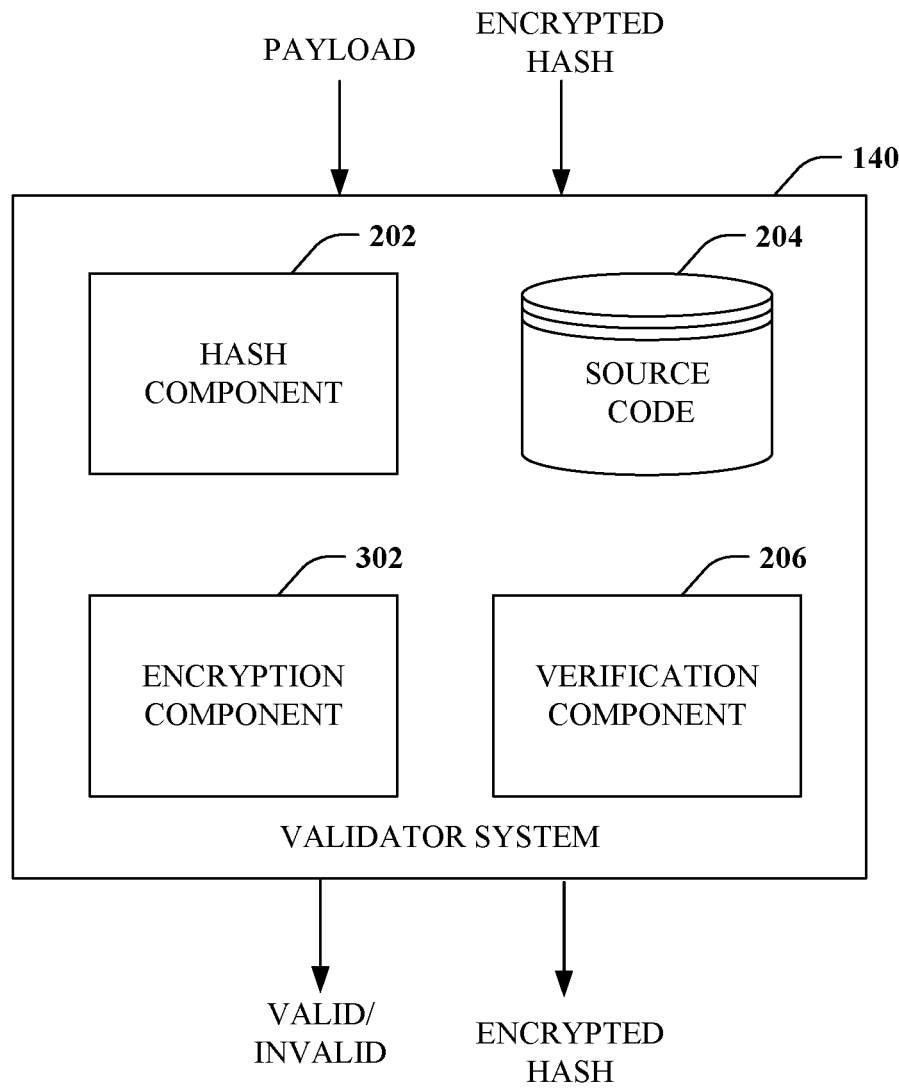
FIG. 4 is a block diagram of yet another example validator system.

FIG. 4 depicts an example validator system 140 in accordance with another embodiment. Similar to FIGS. 2 and 3, the validator system 140 includes the hash component 202, data store 204, verification component 206, and encryption component 302. The validator system 140 is operable to receive payload and an encrypted hash as input and provide a result of valid or invalid and an encrypted hash as output. Each of the components can be embodied as computer-executable components, including instructions that, when executed by a processor, cause the processor to implement the functionality of the validator system 140.

As described with respect to FIG. 3, the hash component 202 is operable to generate a hash value for a payload by way of execution of a hash function. The hash component 202 can receive, retrieve, or otherwise obtain a function payload and source code that, when executed, produced the payload. The payload and source code can be combined, for example, by appending the payload to the source code or vice versa. Subsequently, a hash function can be executed over the combination. The hash function can map the combination of arbitrary size to a fixed size value.

The data store 204 stores validation relevant data such as the source code for one or more functions. The data store 204 can store copies of a function's own source code for use in generating a combined hash of a produced payload and source code. Further, the data store 204 can include source code from other upstream functions in a chain of functions. In effect, the data store can maintain a list of other upstream functions from which a function is expected to receive input or interact based on a design of a workflow. The data store 204 can be persisted locally with a function or remotely and network-accessible. Further, the data store 204 can be encrypted in one embodiment to keep the source code secret.

The encryption component 302 is operable to produce an encrypted hash value by way of an encryption algorithm or function as well as decrypt and encrypted hash value. The encryption component 302 can receive, retrieve, or otherwise obtain or acquire a hash of a payload and source code associated with generation of the payload. An encryption algorithm is subsequently executed on the hash to produce an encrypted hash. The encryption component 302 is also configured to operate in reverse to decrypt an encrypted hash and return the original hash. In one instance, symmetric-key encryption can be employed. In this case, the encryption component 302 can retrieve a key locally from the data store 204 or a remote network-accessible storage device and use the key to both encrypt and decrypt the hash. Alternatively, asymmetric-key encryption can be employed in which separate keys are utilized to encrypt and decrypt the hash. For example, a function can utilize a public key of the destination or downstream function to encrypt the hash, and the downstream function can use its private key to decrypt the hash. While a hash transforms the combination of a payload and source code, the addition of encryption adds another layer of protection, for example, in a case in which the source code is unintentionally revealed or otherwise becomes available.

The verification component 206 is operable to verify or validate that a payload was received from a trusted source, namely a trusted function. The verification component 206 can trigger the encryption component 302 to decrypt a received encrypted hash, thereby revealing a hash value. Further, the verification component can trigger generation of a hash of a combination of the received payload and known source code associated with production of the payload. Subsequently, the received and decrypted hash can be compared with the generated hash. If the hashes match, the payload is classified as valid, and processing can proceed uninterrupted. If there is a mismatch in the hashes, the payload can be deemed invalid, and execution can be prevented or blocked. Of course, other actions or operations can be optionally associated with an invalid payload.

The aforementioned systems, architectures, platforms, environments, or the like have been described with respect to interaction between several components. It should be appreciated that such systems and components can include those components or sub-components specified therein, some of the specified components or sub-components, and/ or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished following either a push and/or pull control model. The components may also interact with one or more other components not specifically described herein for the sake of brevity but known by those of skill in the art.

In view of the example systems described above, methods that may be implemented in accordance with the disclosed subject matter will be better appreciated with reference to flow chart diagrams of FIGS. 5-10. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 5:
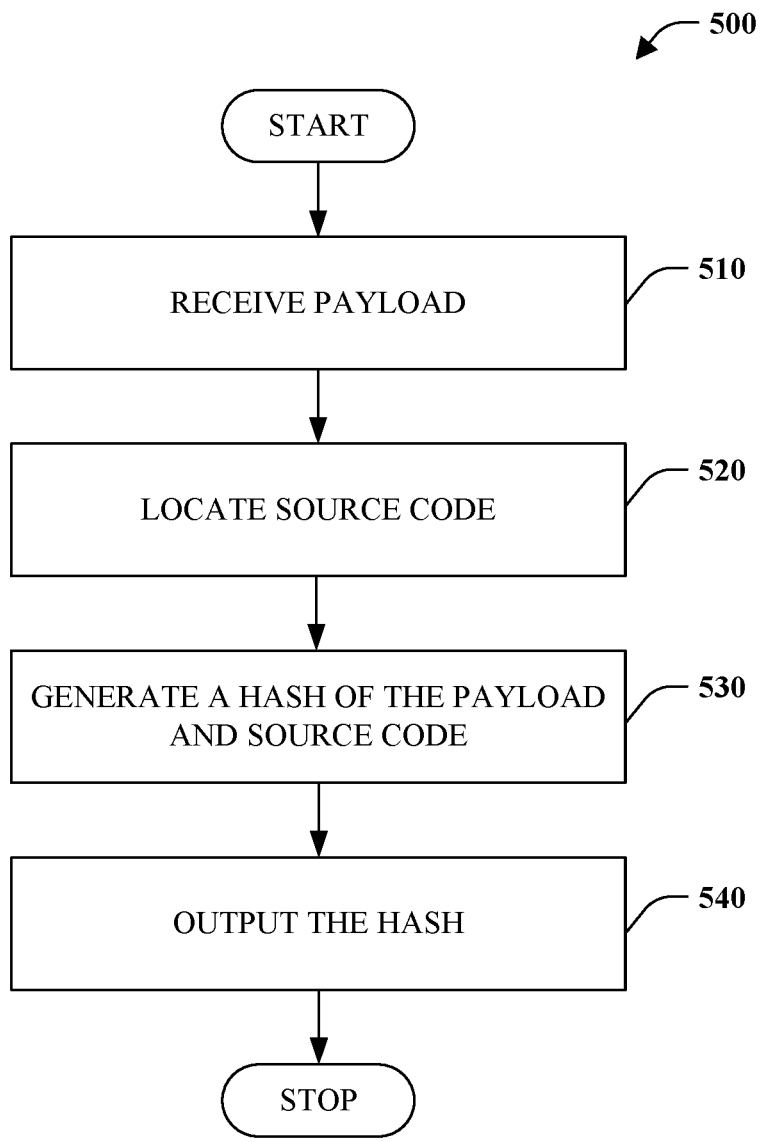
FIG. 5 is a flow chart diagram of a hashing method.

Turning attention to FIG. 5, a hashing method 500 is depicted in accordance with an aspect of this disclosure. The method 500 can be performed by the validator system 140 and, more specifically, the hash component 202.

At reference numeral 510, a payload is received or otherwise made available. In one scenario, the payload is generated locally by a function and received after generation. In another situation, the payload can be received, retrieved, or otherwise obtained or acquired from a message from another function, such as from an upstream function to a downstream function.

At numeral 520, the source code can be located. The source code can correspond to code that is responsible for generation of the payload. In one instance, the source code can be a local function that recently generated the payload. In another instance, the source code can be associated with another function, such as a component upstream in a workflow. Local source code of a function or source code of a trusted function can be saved locally to a function in a data store. For example, a table that identifies a function by name or another identifier followed by corresponding source code can be present. Of course, the source code can be located external to the function but accessible through a network.

At numeral 530, a hash value, or simply a hash, is generated from the payload and the source code. The payload and the source code can first be combined in any number of ways. For example, the payload could be appended to the end of the source code or vice versa. Once combined, a predetermined hash function can be applied. A hash function can map an arbitrary number of elements of the combination to a fixed-size representation.

At numeral 540, the hash is output for utilization. For instance, the hash can be generated and included as part of a message, including a payload destined for a downstream function. Alternatively, the hash can be generated in response to a received message to confirm the sending function is trustworthy.

Figure 6:
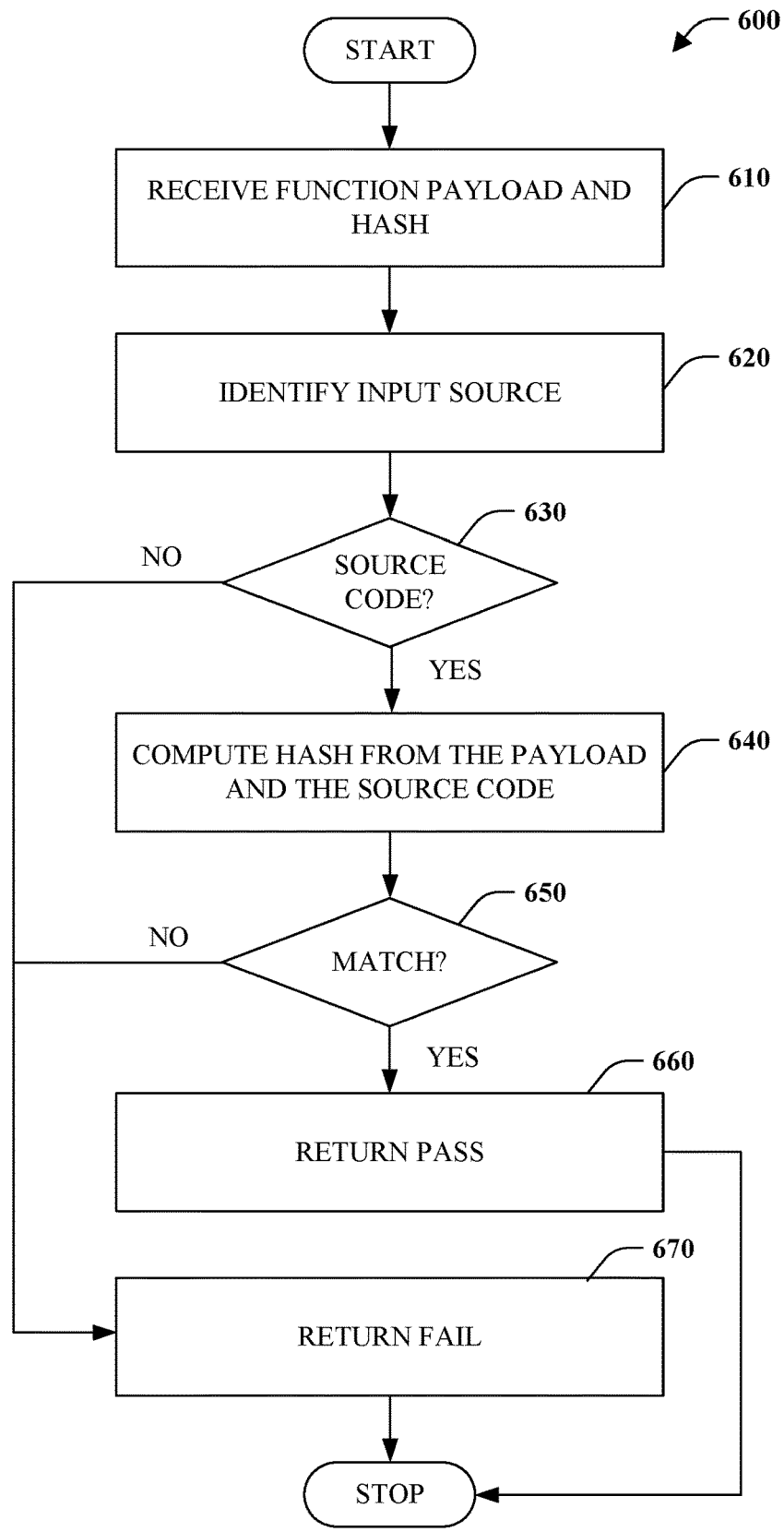
FIG. 6 is a flow chart diagram of a validation method based on a hash.

FIG. 6 depicts a method 600 of validating a payload before initiating processing. The method 600 can be implemented and performed by the validator system 140.

At numeral 610, the method receives a function payload and hash. The payload and hash can be received as a message between multiple functions in a streaming, serverless environment. The message can include a header, metadata, and the payload that is the intended message. The hash can be included as part of the header or metadata of the message.

At reference numeral 620, an input source is identified. The input source can correspond to the sender of the message. Accordingly, the message header and metadata can be analyzed to determine the identity of the sender of the message. The identity in one instance can correspond to an identifier or name of an upstream function in a string of functions.

At numeral 630, a determination is made as to whether source code for the identified input source is available. In accordance with one aspect, source code for trusted sources is saved locally to a function and, more particularly, a function validator. Accordingly, the determination can comprise determining whether source code for the identified input source is present. Alternatively, the source code could be stored external to a function validator but available over a network. In this instance, the determination can involve querying an external data source. A hybrid approach is also contemplated in which the message identifies the input source for which source code is available, which can subsequently be acquired from a network-accessible device.

The presence or absence of source code can act as a semaphore or other mechanism to control access to function processing as well as further processing regarding validating an input as trustworthy. As such, if there is no source code for the input source ("NO"), the method continues to numeral 670, where a validation fail signal is returned, and the method terminates. If there is source code for the input source ("YES"), the method proceeds to numeral 640.

At numeral 640, a hash value, or simply a hash, is computed from the payload and the source code. The payload and source code can be combined in any number of ways. For example, the source code could be appended to the payload or vice versa. A hash function can then be applied to the combination of payload and source code to produce a resultant hash. The hash function can be substantially any function that maps data of arbitrary size to fixed-size values. For instance, "John Smith" can be mapped to a two-digit hash such as "02."

At 650, a determination is made as to whether or not a match exists between a received hash and a generated hash. In other words, the determination relates to whether the received hash has the same value as the generated hash. If there is not a match but rather a mismatch ("NO"), the method continues at 670, where a validation failure signal is returned, and the method terminates. If there is a match ("YES"), the method proceeds to 660, where a validation pass signal is returned before the method terminates.

Figure 7:
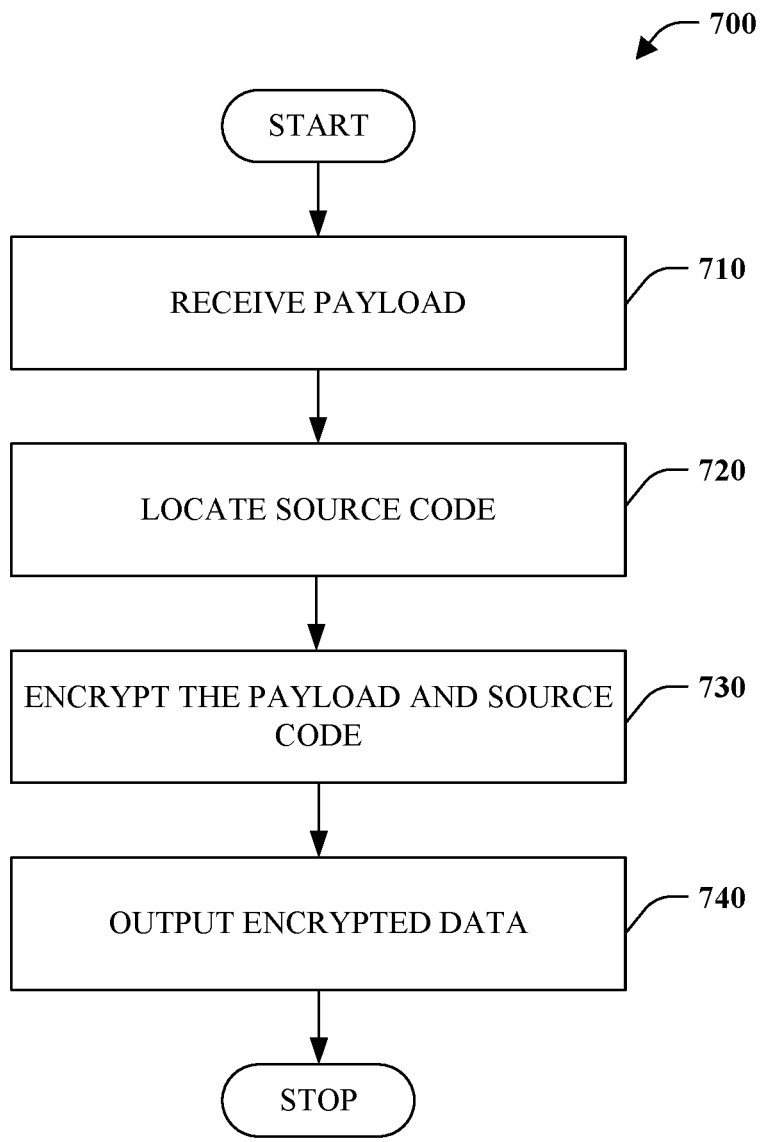
FIG. 7 is a flow chart diagram of an encryption method.

Turning to FIG. 7, an encryption method 700 is depicted in accordance with an aspect of this disclosure. The method 700 can be performed by the validator system 140 and, more specifically, the encryption component 302.

At reference numeral 710, a payload is received, retrieved, or otherwise obtained or acquired. In one instance, the payload is generated locally by a function and received after generation. In another instance, the payload can be received or acquired from a message sent by a function, such as from an upstream function, by a message protocol, to a downstream function.

At numeral 720, source code associated with the payload is located. The source code is code that, when executed, generates the payload. The source code can be stored local to a function or, more particularly, to a validator of the function. For example, a data structure local to ta function can comprise the source code of the function and other trusted functions. Alternatively, the source code can be stored external to a function, such as in a network-accessible data store. In this case, the external data store can be queried to locate the source code.

At reference 730, the payload and source code can be encrypted. The payload and source code can be combined in any one of many ways. For example, the payload can be appended to the source code, or the source code can be appended to the payload. An encryption function or algorithm can be applied to the combination of the payload and the source code, thus transforming plain text to cipher text or encrypted data.

At numeral 740, the cipher text or encrypted data can be output for subsequent utilization. In one situation, encrypted data can be generated and included as part of a message, including a payload destined for a downstream function. In another situation, the encrypted data can be generated in response to a received message to confirm the trustworthiness of a sending function in a situation in which encrypted data is compared.

Figure 8:
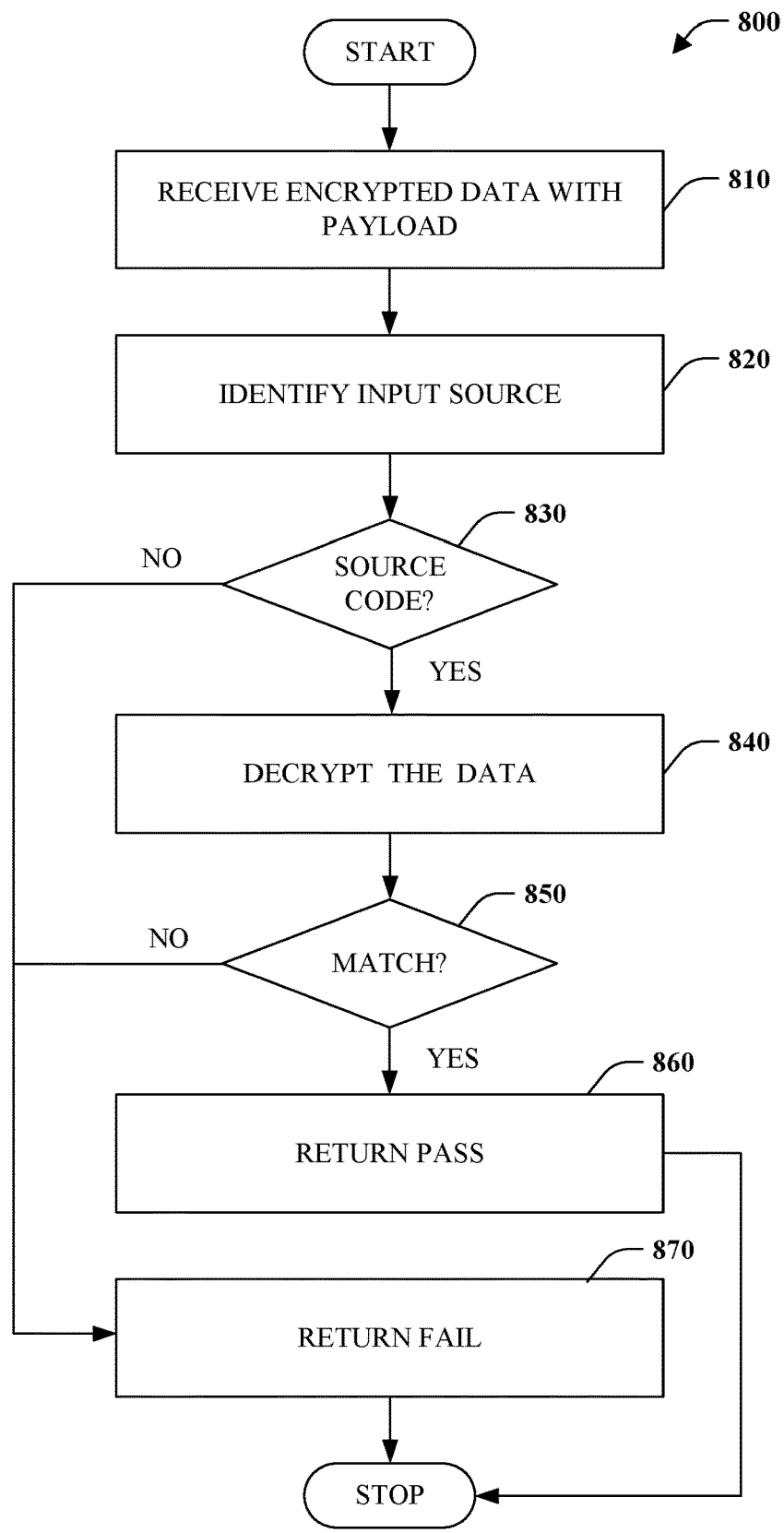
FIG. 8 is a flow chart diagram of a method of validation based on an encrypted value.

FIG. 8 depicts a method 800 of validating a payload prior to initiating processing based on encrypted data. The method 800 can be implemented and performed by the validator system 140, including the encryption component 302, verification component 206, and data store 204.

At reference numeral 810, a message is received comprising encrypted data as well as a payload. The encrypted data can comprise a part of a message header or metadata that also includes the payload. Further, the message can be sent by way of a message protocol from an upstream function to a downstream function such that the downstream function receives the encrypted data and payload.

At numeral 820, the input source is identified. The input source can correspond to the source of a received message, such as a function. Message header or metadata can be analyzed to determine the identity of an input source.

At numeral 830, a determination is made as to whether or not source code for the identified input source is available. Source code for trusted sources can be saved locally to a function or, more particularly, a function validator. Consequently, the determination can comprise determining whether source code for the identified input source is present. Alternatively, the source code could be stored external to a function validator but available over a network. In this case, the determination can involve querying an external data source. A hybrid approach is also contemplated in which the message identifies the input source for which source code is available, which can subsequently be acquired from a network-accessible device.

At reference 840, the encrypted data received with a message can be decrypted. In other words, the cipher text is transformed back to plain text. Decryption can be accomplished using the same key used to encrypt the data in a symmetric encryption approach or utilizing using a private key of a public-private key pair for an asynchronous encryption approach.

At numeral 850, a determination is made as to whether there is a match between the payload received and the located source code and the decrypted data. The matching can first involve combining the received payload and identified source code and comparing the combination. Alternatively, the decrypted data can be segmented into payload and source code. The source code from the decrypted data can be compared to the located source code to determine a match. If a match is not identified, or there is a mismatch ("NO"), the method returns a failure signal at 870 and terminates.

Alternatively, if a match is identified ("YES"), a pass or success signal is returned at 860, and the method 800 terminates.

Figure 9:
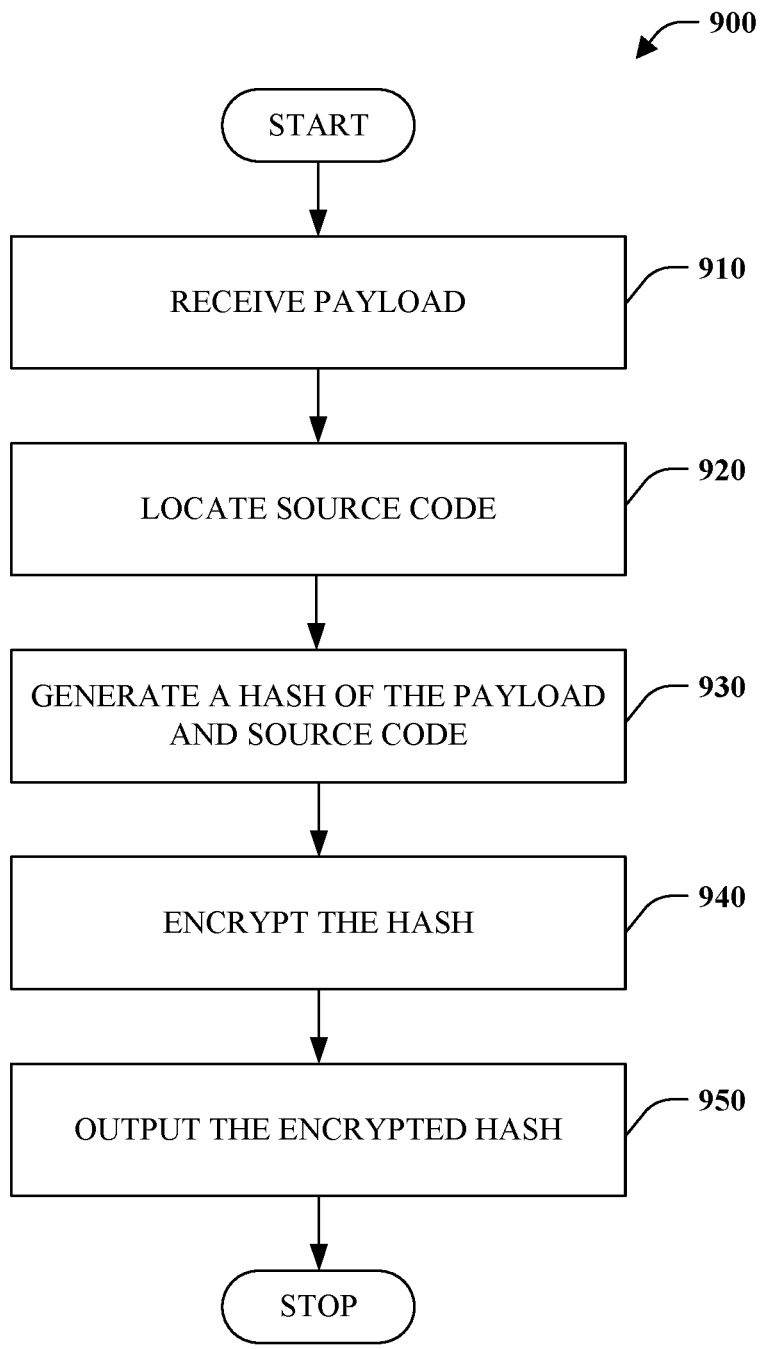
FIG. 9 is a flow chart diagram of a method of hashing and encryption.

FIG. 9 is a flow chart diagram of a method 900 of hashing and encryption in accordance with one embodiment. The method 900 can be implemented and executed by the validator system 140, including the hash component 202, the encryption component 302, and the verification component 206.

At 910, a payload is received, retrieved, or otherwise obtained or acquired. In one instance, the payload can be received as part of a message from an upstream function through a messaging protocol associated with a serverless or function as a service architecture. The message can include a header, metadata, and payload.

At numeral 920, source code or other code associated with the payload can be located. In accordance with one embodiment, the message, including the payload, can identify a function, or the like, that sends the message. An identifier of the function can be located and used to determine applicable source code. In one instance, a receiving function, or more specifically a function validator, can store source code of trustworthy and expected functions locally in a data structure such as a table. The identifier can be utilized to identify the presence or absence of source code and retrieve the applicable source code when present. Alternatively, the source code can be store external to the function validator. In this case, a query can be submitted to a remote network-accessible service to acquire the source code.

At reference numeral 930, a hash value, or simply a hash, is generated from the payload and the source code. The payload and the source code can first be combined in any number of ways. For example, the payload could be appended to the end of the source code or vice versa. Once combined, a predetermined hash function can be applied. A hash function can map an arbitrary number of elements of the combination to a fixed-size representation.

At numeral 940, the hash value is encrypted. An encryption function or algorithm can be applied to the hash value transforming the hash into encrypted data. The addition of encryption in this embodiment provides an additional layer of security for the transmission of a hash between functions. For instance, encryption can further obfuscate the hash making it more challenging to determine the source code or hash thereof. Further, the encrypted data can be used as the point of comparison in one embodiment instead of a fixed size hash value.

At numeral 950, the encrypted hash is output. For example, the hash can be output with a message comprising a payload for further processing downstream and for use in verifying or validating that the payload was received from a trustworthy. In one instance, the encrypted hash can be computed by a function for comparison purposes with a received encrypted hash.

Figure 10:
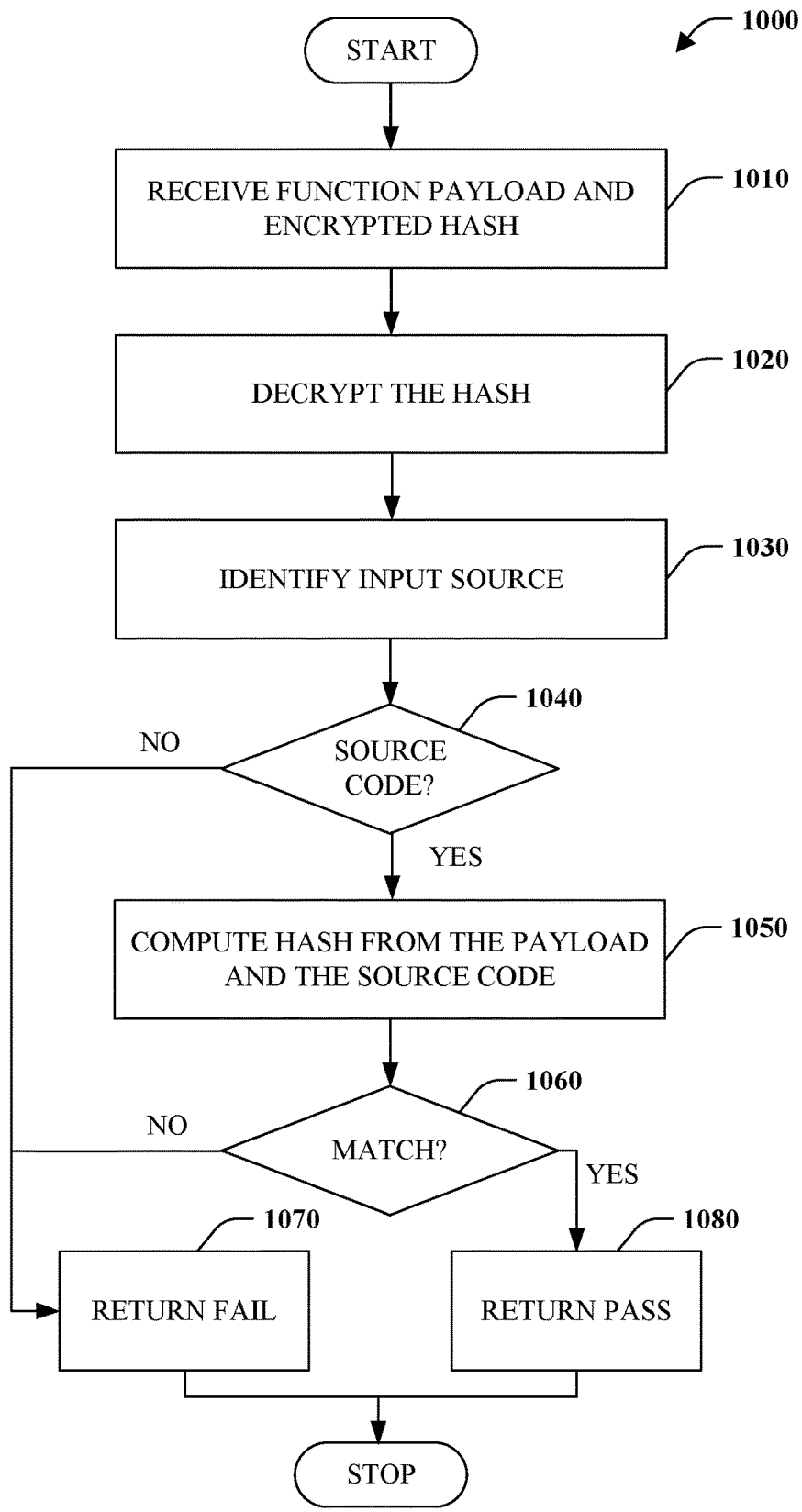
FIG. 10 is a flow chart diagram of a method of validation based on an encrypted hash.

FIG. 10 illustrates a method 1000 of validation with encrypted hash. The method 1000 can be implemented and performed by the validation system 140, and more specifically, the hash component 202, encryption component 302, and verification component 206.

At reference numeral 1010, a function payload and encrypted hash are received, retrieved, or otherwise obtained or acquired. In one instance, the payload and encrypted hash are included in a message sent by way of a message protocol from a first function to a second function in a serverless or function as a service computing environment.

At numeral 1020, the encrypted hash is decrypted. In the case of symmetric encryption, the same key used to encrypt the hash can be utilized to decrypt the hash. In the case of asymmetric encryption, a different key is used to decrypt the hash. For example, a public key can be utilized to encrypt the hash, and a private key can be employed to decrypt the hash.

At 1030, an input source is identified. The input source corresponds to the source of a provided payload of data input for further processing. In one instance, a function receives a message comprising a header, metadata, and payload. An identifier, or name, of an input source can be provided and identified from a header or metadata of the message.

At numeral 1040, a determination is made as to whether source code for the input source can be acquired. In one embodiment, the source code for trustworthy functions can be stored local to a function, and, more particularly, to a function validator. Alternatively, the source code can be stored external to the function, such as in a remote network-accessible store. In one instance, locating and acquiring source code acts as a first-level gate that controls whether or not further processing is employed. If the source code is unavailable ("NO"), the method returns a failure signal at 1070 and terminates. Alternatively, if the source code is available ("YES"), the method continues at 1050.

At numeral 1050, a hash is computed from the received payload and the source code. For example, the payload and the source code can be combined by appending the payload to the source code or vice versa. Once combined, a predetermined hash function can be applied. A hash function can map an arbitrary number of elements of the combination to a fixed-size representation.

At reference numeral 1060, a determination is made as to whether or not a match is present. A match or mismatch can be determined based on comparing the hash received to the hash computed based on a combination of payload and source code. If a match is deemed to exist ("YES"), the method can proceed to 1080, where a pass or success signal is returned. By contrast, if a match is determined not to exist, but rather there is a mismatch ("NO"), the method continues to 1070, where a failure signal is returned prior to the method terminating.

The subject disclosure pertains to the technical problem of ensuring that functions in a serverless architecture receive payloads from trusted sources prior to initiating processing. The technical solution includes generating a value based on a combination of the payload and source code associated with the payload generation and utilizing that value to verify or validate that a payload was received from a trusted source before initiating processing. The value can be a hash, encrypted data, or a combination of a hash and encrypted data, among other things.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 11:
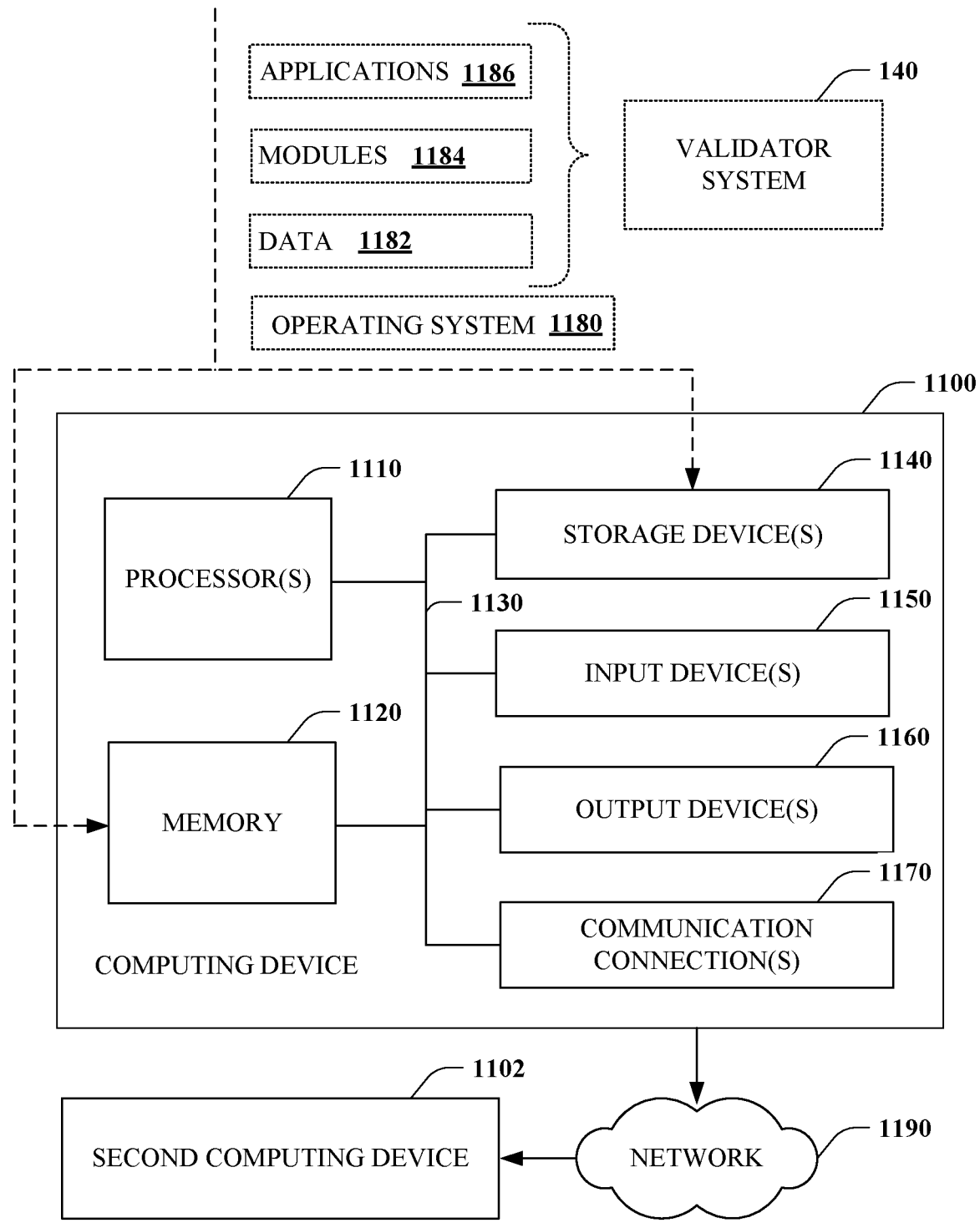
FIG. 11 is a block diagram illustrating a suitable operating environment for aspects of the subject disclosure.

To provide a context for the disclosed subject matter, FIG. 11, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, that perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on stand-alone computers. In a distributed computing environment, program modules may be located in one or both of local and remote memory devices.

With reference to FIG. 11, illustrated is an example computing device 1100 (e.g., desktop, laptop, tablet, watch, server, hand-held, programmable consumer or industrial electronics, set-top box, game system, compute node, . . . ). The computing device 1100 includes one or more processor(s) 1110, memory 1120, system bus 1130, storage device(s) 1140, input device(s) 1150, output device(s) 1160, and communications connection(s) 1170. The system bus 1130 communicatively couples at least the above system constituents. However, the computing device 1100, in its simplest form, can include one or more processors 1110 coupled to memory 1120, wherein the one or more processors 1110 execute various computer-executable actions, instructions, and or components stored in the memory 1120.

The processor(s) 1110 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1110 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 1110 can be a graphics processor unit (GPU) that performs calculations concerning digital image processing and computer graphics.

The computing device 1100 can include or otherwise interact with a variety of computer-readable media to facilitate control of the computing device to implement one or more aspects of the disclosed subject matter. The computer-readable media can be any available media accessible to the computing device 1100 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 1100. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 1120 and storage device(s) 1140 are examples of computer-readable storage media. Depending on the configuration and type of computing device, the memory 1120 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 1100, such as during start-up, can be stored in non-volatile memory, while volatile memory can act as external cache memory to facilitate processing by the processor(s) 1110, among other things.

The storage device(s) 1140 include removable/non-removable, volatile/non-volatile storage media for storage of vast amounts of data relative to the memory 1120. For example, storage device(s) 1140 include, but are not limited to, one or more devices such as a magnetic or optical disk drive, floppy disk drive, flash memory, solid-state drive, or memory stick.

Memory 1120 and storage device(s) 1140 can include, or have stored therein, operating system 1180, one or more applications 1186, one or more program modules 1184, and data 1182. The operating system 1180 acts to control and allocate resources of the computing device 1100. Applications 1186 include one or both of system and application software and can exploit management of resources by the operating system 1180 through program modules 1184 and data 1182 stored in the memory 1120 and/or storage device(s) 1140 to perform one or more actions. Accordingly, applications 1186 can turn a general-purpose computer 1100 into a specialized machine in accordance with the logic provided thereby.

All or portions of the disclosed subject matter can be implemented using standard programming and/or engineering techniques to produce software, firmware, hardware, or any combination thereof to control the computing device 1100 to realize the disclosed functionality. By way of example and not limitation, all or portions of the validator system 140 can be, or form part of, the application 1186, and include one or more modules 1184 and data 1182 stored in memory and/or storage device(s) 1140 whose functionality can be realized when executed by one or more processor(s) 1110.

In accordance with one particular embodiment, the processor(s) 1110 can correspond to a system on a chip (SOC) or like architecture including, or in other words integrating, both hardware and software on a single integrated circuit substrate. Here, the processor(s) 1110 can include one or more processors as well as memory at least similar to the processor(s) 1110 and memory 1120, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the validator system 140 and/or functionality associated therewith can be embedded within hardware in a SOC architecture.

The input device(s) 1150 and output device(s) 1160 can be communicatively coupled to the computing device 1100. By way of example, the input device(s) 1150 can include a pointing device (e.g., mouse, trackball, stylus, pen, touchpad, . . . ), keyboard, joystick, microphone, voice user interface system, camera, motion sensor, and a global positioning satellite (GPS) receiver and transmitter, among other things. The output device(s) 1160, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 1150 and output device(s) 1160 can be connected to the computing device 1100 by way of wired connection (e.g., bus), wireless connection (e.g., Wi-Fi, Bluetooth, . . . ), or a combination thereof.

The computing device 1100 can also include communication connection(s) 1170 to enable communication with at least a second computing device 1102 utilizing a network 1190. The communication connection(s) 1170 can include wired or wireless communication mechanisms to support network communication. The network 1190 can correspond to a local area network (LAN) or a wide area network (WAN) such as the Internet. The second computing device 1102 can be another processor-based device with which the computing device 1100 can interact. In one instance, the computing device 1100 can execute a validator system 140 for a first function, and the second computing device 1102 can execute a validator system 140 for a second function in a distributed processing environment. Further, the second computing device can provide a network-accessible service that stores source code, and encryption keys, among other things that can be employed by the validator system 140 executing on the computing device 1100.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A system, comprising:
 a processor coupled to a memory that includes instructions associated with a function of a serverless framework that, when executed by the processor, cause the processor to:
  execute a first function to generate a result payload;
  acquire source code for the first function;
  compute a validation value based on the result payload and the source code; and
  output the result payload and the validation value to a second function.

2. The system of claim 1, wherein the validation value is a hash of the result payload combined with the source code.

3. The system of claim 1, wherein the validation value is encrypted data corresponding to a combination of result payload and source code.

4. The system of claim 1, wherein the validation value is an encrypted hash of the result payload combined with the source code.

5. The system of claim 1, wherein instructions of the second function further cause the processor to:
  compute a second validation value based on the result payload and the source code of the first function;
  compare the second validation value to the validation value; and
  control execution of the second function based on a result of the compare.

6. The system of claim 5, wherein the instructions further cause the processor to prevent execution of the second function when there is a mismatch between the second validation value and the validation value.

7. The system of claim 5, wherein the validation value and the second validation value are hashes of a combination of the result payload and the source code of the first function.

8. The system of claim 7, wherein the combination comprises the source code appended to the result payload.

9. The system of claim 5, wherein the first function and the second function comprise a workflow that identifies an abnormal merchant transaction and sends a notification to a user regarding the transaction.

10. The system of claim 5, wherein the first function and the second function comprise a workflow that performs processing in response to an account change.

11. A method of providing function as a service, comprising:
    executing a first function to generate a result payload;
    acquiring source code for the first function that generated the result payload;
    computing a first hash of the result payload and the source code; and
    outputting the result payload and the first hash to a second function.

12. The method of claim 11, further comprising:
    computing a second hash of the result payload and the source code of the first function;
    comparing the second hash to the first hash; and
    controlling execution of the second function based on a result of the comparing.

13. The method of claim 12, further comprising preventing execution of the second function when there is a mismatch between the second hash and the first hash.

14. The method of claim 12, further comprising preventing execution of the second function when the source code of the first function is unknown.

15. The method of claim 11, further comprising encrypting the first hash before outputting the first hash.

16. The method of claim 15, further comprising:
    computing a second hash from the result payload and the source code of the first function;
    encrypting the second hash; and
    controlling execution of the second function based on a result of a comparison of encrypted versions of the first hash and the second hash.

17. A method, comprising:
    executing, on a processor, instructions that cause the processor to perform operations associated with a function provided as a service in a serverless framework, the operations comprising:
        identifying source code of a first function in response to receipt of a payload and a first hash from the first function;
        generating a second hash from the payload and the source code of the first function; and
        controlling execution of a second function based on a comparison between the first hash and the second hash, wherein execution of the second function is prevented when there is a mismatch between the first hash and the second hash.

18. The method of claim 17, the operations further comprising:
    executing the second function to produce a second payload; and
    generating a third hash from a combination of the second payload and source code of the second function.

19. The method of claim 17, the operations further comprising preventing execution of the second function when the source code of the first function is unknown.

20. The method of claim 17, further comprising decrypting the first hash before the comparison when the first hash is encrypted.

* * * * *